United States Patent [19]

Hedrén et al.

[11] 4,348,575
[45] Sep. 7, 1982

[54] CONTACT DEVICE

[75] Inventors: A. Thomas Hedrén, Askersund; Rolf G. Larsson, Laxå, both of Sweden

[73] Assignee: ESAB Aktiebolag, Gothenburg, Sweden

[21] Appl. No.: 162,428

[22] Filed: Jun. 24, 1980

[30] Foreign Application Priority Data

Jun. 28, 1979 [SE] Sweden .................... 7905678

[51] Int. Cl.³ .............................. B23K 11/24
[52] U.S. Cl. ........................ 219/86.33; 219/78.01; 219/86.1; 219/125.1; 339/8 A
[58] Field of Search .......... 219/78.01, 86.1, 86.25, 219/86.33, 86.7, 124.33, 125.1; 339/5 R, 5 A, 6 A, 8 R, 8 A; 308/DIG. 1

[56] References Cited

U.S. PATENT DOCUMENTS

| 1,849,930 | 3/1932 | Ives . | |
|---|---|---|---|
| 2,752,302 | 6/1956 | Magnus | 219/86.25 X |
| 2,879,374 | 3/1959 | Seeloff | 339/6 A X |
| 3,534,198 | 10/1970 | Miller | 339/8 R X |
| 3,649,789 | 3/1972 | Stoll . | |
| 3,744,858 | 7/1973 | Weischsel | 308/DIG. 1 X |
| 3,763,344 | 10/1973 | Okabe et al. . | |
| 3,960,417 | 6/1976 | Kraus | 308/DIG. 1 X |

FOREIGN PATENT DOCUMENTS

| 1765415 | 7/1971 | Fed. Rep. of Germany . |
| 2349635 | 1/1975 | Fed. Rep. of Germany . |
| 1378196 | 12/1974 | United Kingdom . |

Primary Examiner—Gene Z. Rubinson
Assistant Examiner—Keith E. George
Attorney, Agent, or Firm—Lerner, David, Littenberg & Samuel

[57] ABSTRACT

A combined pivot joint and electric contact device between two welding current conductors forming part of the welding circuit of a resistance welder. The device is provided with a pair of contact plates extending at right angles to the joint axis and connected each to one of the welding current conductors. The plates are rotatable and axially displaceable with respect to each other. A yieldable thrust member urges the plates into engagement with each other. A channel provided in at least one of the plates has an outlet in the contact face of the plate and an inlet away from said face. Separation of the plates is effected by connecting the channel to a source of compressed gas to discharge a current of gas through the port.

8 Claims, 7 Drawing Figures

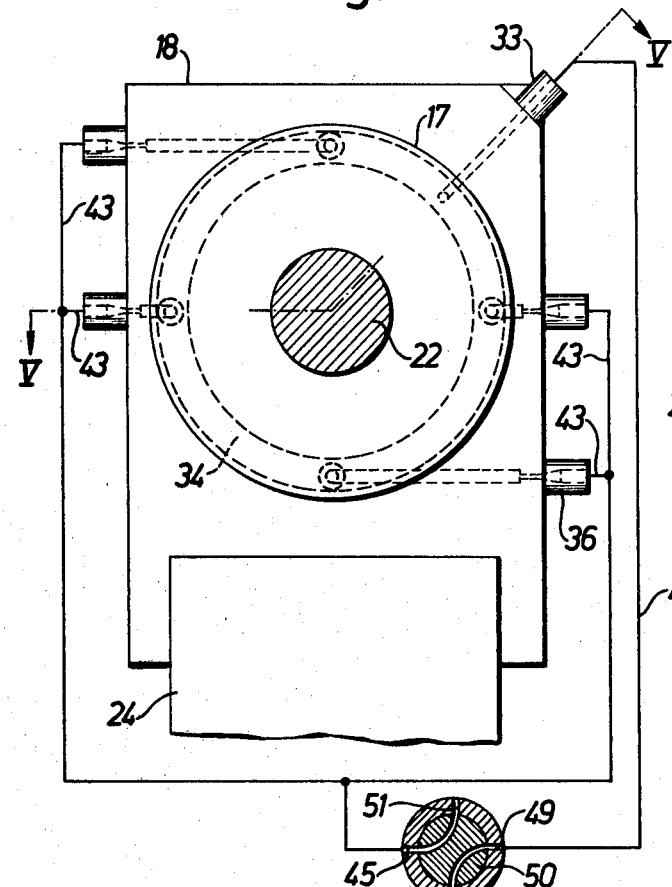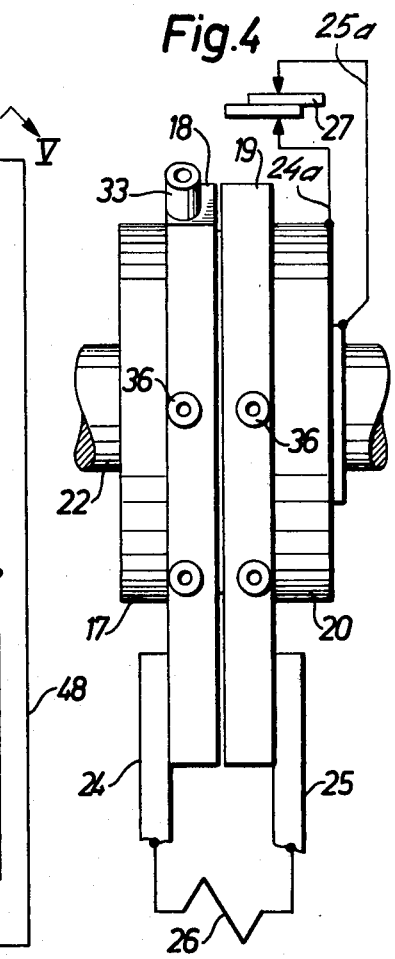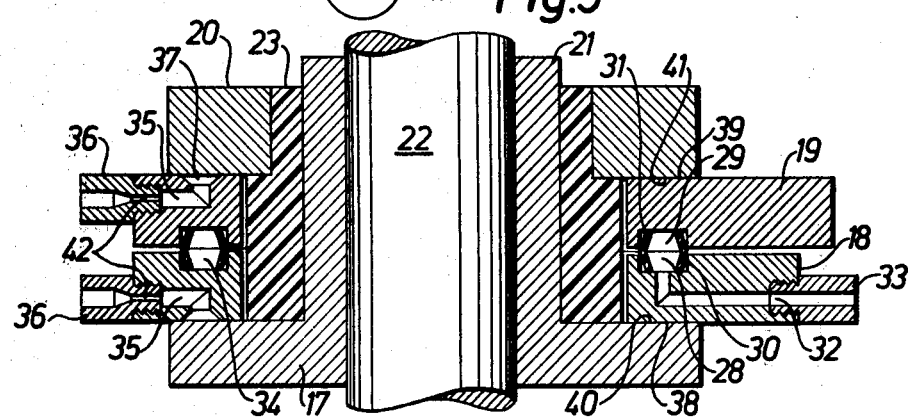

CONTACT DEVICE

BACKGROUND OF THE INVENTION

In welding robots for resistance welding, a welding head equipped with the required welding electrodes or welding tools is supported by an arm composed of two or more members connected with each other and with a stationary support member by adjustable pivot joints. The welding current may be supplied to the welding head by a flexible cable connecting the welding head to a stationary welding transformer. This system is, however, not satisfactory. After a period of operation, the stresses to which the cable is subjected by the repeated bending will cause fatigue breakage of the cable conductors to occur. As the cable has necessarily to be thick and heavy to carry the large currents required in resistance welding (which may be of the order of 10,000 amps. or more), the cable is liable to hamper the movements required for adjusting the position of the gun and also to impair the precision of the adjustment. For these reasons, it has already been suggested to replace the welding cable by a plurality of conductor elements connected in series by means of contact devices arranged at the pivot joints. Each of said contact devices consists of a pair of flat contact plates extending at right angles to the pivot axis and arranged in close juxtaposition. One of the contact plates is secured against rotation with respect to one of the members connected by the pivot joint, and the other contact plate is secured against rotation with respect to the other of said members. Each of the conductor elements is connected between two contact plates secured against rotation with respect to one and the same member. With this arrangement, adjustment of the pivot joints submits the conductor elements to no stresses or changes of shape whatever.

The system described is, however, not without serious disadvantages. In order to ensure a sufficiently low transition resistance, the contact plates have to be kept in engagement with each other by means exerting a strong mechanical pressure. Consequently, the motor and transmission means used for effecting the required angular adjustments of the members connected by the pivot joints have to be capable of providing a comparatively large torque in order to overcome the friction resulting from the contact pressure of the contact plates. This requirement is contrary to other desirable properties of the motor and transmission means, to wit, that it shall be capable of a swift adjusting action and that it shall occupy a minimum of space.

SUMMARY OF THE INVENTION

It is a primary object of the present invention to provide an improved contact device of the type comprising a pair of flat contact plates for electrically connecting a pair of welding current conductors which are angularly adjustable about a pivot pin with respect to each other. More particularly, the improved contact device shall be capable of providing an adequate contact pressure between the contact plates but allow angular adjustment of the contact plates with respect to each other with a minimum of effort.

Another object of the invention is to provide, in a device comprising a pair of members and a pivot joint connecting said members, improved coupling means for selectively blocking and admitting relative angular displacement of said members.

Still another object is the provision of an improved switch, particularly for carrying high currents of the magnitude used in resistance welding, of the kind comprising a pair of contact members having flat opposed faces and guided for movement towards and away from each other, the improvement residing in particularly simple and efficient means for moving the contact members out of engagement with each other.

According to a principal feature of the invention, at least one of the contact plates or clutch plates of the pair of cooperating plates is provided with at least one channel connecting an inlet opening with an outlet port in the plate surface facing the other plate, said inlet opening being connected to a source of compressed gas by a conduit provided with a valve. On opening of the valve, the compressed gas discharged through the port will cause the plates to move slightly apart to form a narrow gap through which the gas escapes. Preferably at least three channels are provided, the outlet ports of which are evenly distributed around the pivot axis, in order to establish a flow pattern which is symmetrical with respect to the pivot axis. A further improvement is obtained by providing a restricted passage (metering passage) between each of the channels or outlet ports and the compressed-gas conduit. Proper adjustment of said metering passages ensures that the parallelism of the opposed plate faces is maintained when the plates are moving apart with respect to each other. As a result, the width of the gap between the plates will be uniform throughout the area of the opposed plate faces. A separation stroke of a few tenths of a millimeter only will therefore be sufficient to ensure that the plates are entirely out of contact with each other. The area of the opposed plate faces, which is determined by the current to be employed and the allowable current density per unit area of the contact faces, may be quite large. While the contact device of the invention may be useful for handling currents as low as 1000 amps., it is primarily intended for welding currents upwards of 10000 amps.

Other objects and advantages of the present invention will be apparent from the following detailed description of embodiments thereof taken in conjunction with the accompanying drawings.

BRIEF DESCRIPTION OF DRAWINGS

FIG. 3 shows a second embodiment of the invention, viewed in the direction of the pivot axis, FIG. 4 is a side view of the device of FIG. 3, FIG. 5 is a sectional view taken on the line V—V of FIG. 3.

DETAILED DESCRIPTION OF ILLUSTRATIVE EMBODIMENTS

Figure 1:
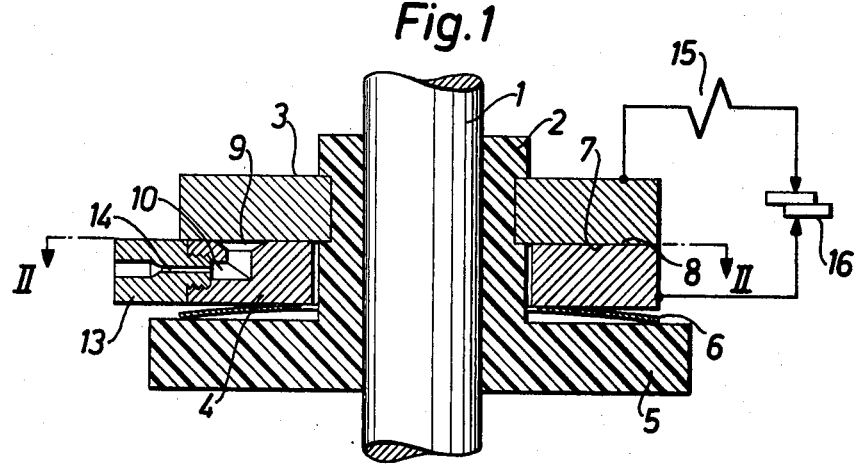
FIG. 1 is a view in axial section of a device according to a first embodiment of the invention.
Figure 2:
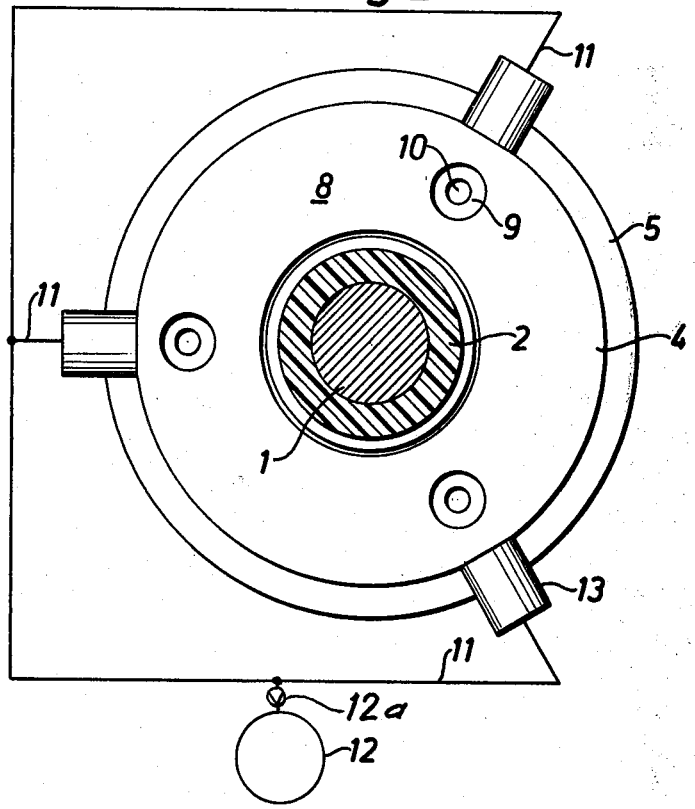
FIG. 2 is a section taken on the line II—II of FIG. 1.

In the device shown in FIGS. 1-2, a sleeve 2 of an electrically insulating material is rotatably supported by a pivot pin 1. The sleeve 2 supports a pair of flat contact plates 3, 4, one plate 3 of which is rigidly attached to the sleeve 2 while the other 4 is rotatable on the sleeve 2 and axially displaceable in a space between the plate 3 and a flange 5 on the sleeve 2. A spring washer 6 provided between the plate 4 and the flange 5 urges the plate 4 towards the plate 3 to produce the required contact pressure between the opposing faces 7, 8 of the plates 3, 4.

The contact plate 4 is provided with three gas channels 10 having outlet ports 9 which are symmetrically distributed on the contact face 8 of the plate 4. The inlet ends of the channels are arranged at the outer periphery of the plate 4 and each provided with a fitting 13 for connecting the channels to a source 12 of compressed gas through conduits 11 and a common valve 12a. The fittings are each provided with a restriction 14.

The contact plates 3, 4 are connected in series in the welding circuit of a resistance welder represented schematically only as the secondary 15 of a welding transformer and a spot welding location 16, When the valve is opened, compressed gas, preferably air, is supplied to the channels 10. The pressure of the gas escaping through the ports 9 pushes the plates 3, 4 out of engagement with each other. The plates 3, 4 now can be rotated with respect to each other. The friction between the spring washer 6 and the flange 5 and/or the plate 4 can, if desired, be reduced by known means.

Instead of the spring washer, other means for yieldably urging the contact plates towards each other may be used.

The contact device of FIGS. 3 to 5 is provided with two pairs of contact plates 17, 18 and 19, 20. The contact plate 17 is integral with a sleeve 21 engaging a pivot pin 22. The plate 20 is firmly fitted on a sleeve 23 of electrically insulating material firmly engaging the sleeve 21. The inner plates 18, 19 loosely engage the insulating sleeve 23. The spacing of the plates 17, 20 allows some axial play to the plates 18, 19. Each of the contact plates 18, 19 is connected to a current conductor bar 24, 25, repectively, while each of the contact plates 17, 20 is connected to a current conductor 25a, 24a, respectively. Said members form part of a welding circuit schematically shown in FIG. 4 to extend from one terminal of the secondary 26 of a welding transformer, through conductor bar 24, contact plates 18 and 17, conductor 25a, welding electrodes straddling a work 27, conductor 24a, contact plates 20 and 19 and conductor bar 25 to the other terminal of the welding transformer secondary 26.

The inner contact plates 18, 19 are each provided with an annular groove 28, 29. Said grooves together form an annular chamber 34 the cylindrical walls of which are provided with V-section sealing rings 30, 31 of a resilient, electrically insulating material the edges of which engage the plane walls of the grooves 28, 29. The annular chamber 34 is connected to a gas channel 32 in the contact plate 18 provided with a fitting 33 connected to a compressed-gas conduit 48. Moreover, each of the contact plates 18, 19 is provided with four gas channels 35 each of which extends from a fitting 36 to an outlet port 37 provided in the contact face 38, 39 of the plate 18, 19. The contact faces 38, 39 are arranged to engage the contact faces 40, 41 of the outer contact plates 17, 20, respectively. As in the embodiment of FIGS. 1-2, the fittings 36 are each provided with a restriction or metering passage 42 for equalizing the currents of gas flowing from the conduits 43 into the passages 35.

Alternatively, the sealing rings 30, 31 may be replaced by a flexible, annular tube connected to the channel 32.

The conduits 43 connected to the fittings 36 of the contact plates 18, 19 are connected to the outlet 45 of a four-way valve 44 connected at 46 to a source 47 of compressed gas. The conduit 48 connects the fitting 33 to the outlet 49 of the four-way valve. A fourth outlet 51 of the valve 44 opens into the atmosphere. In the position of the valve body 50 shown in FIG. 3, the gas source 47 is connected through the conduit 48 to the annular chamber 34, while the channel 35 is connected through the conduits 43 to the atmosphere at 51. The pressure exerted on the plates 18, 19 by the compressed gas in the annular chamber 34 moves the plates 18, 19 axially apart into engagement with the contact plates 17, 20, respectively.

To move the contact plates 18, 19 out of engagement with the plates 17, 20, the valve body 50 is rotated through an angle of 90 degrees. In this position, the valve connects the annular chamber 34 to the atmosphere at 51, while the channels 35 are connected through the conduits 43 to the source 47 of compressed gas. The pressure of the gas now escaping through the ports 37 moves the plates 18, 19 out of engagement with the plates 17, 20. Angular adjustment of the pair of plates 18, 19 with respect to the pair of plates 17, 20 can now be carried out without difficulty.

As already mentioned, the currents of gas discharged through the various ports 37 are limited by the restrictions, or metering passages, 42 of the fittings provided in the channels 35. A proper choice of the cross-sectional area of said restrictions will result in such conditions that the opposed contact faces of the plates are maintained practically parallel to each other. Consequently, a very small spacing of the opposed contact faces will be sufficient to allow the contact plates to rotate freely with respect to each other. For instance, contact plates of the size required to carry a current of about 10,000 amps. require a spacing of only about 0.2 mm to allow them to be rotated with respect to each other with no danger of occasional contact between the plates.

Figure 6:
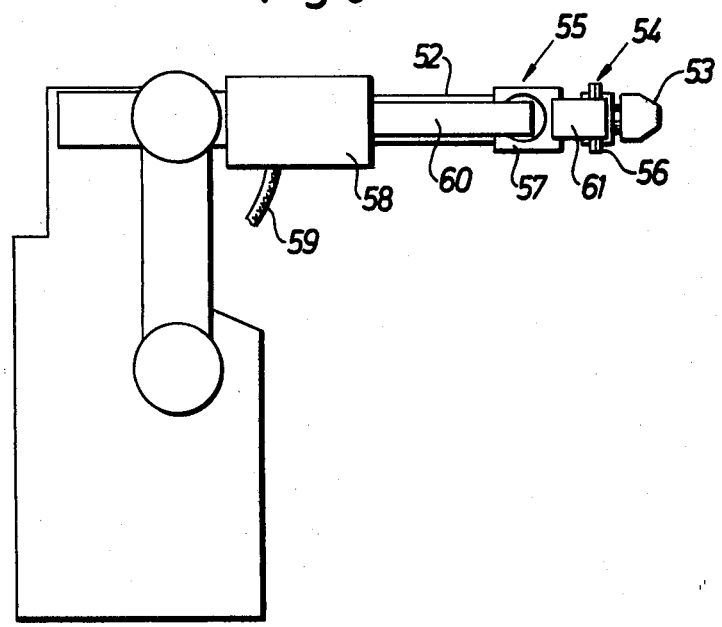
FIG. 6 is a side view of a resistance welding robot equipped with one form of the device according to the invention, and, FIG. 7 is a view from above of the resistance welding robot of FIG. 6.
Figure 7:
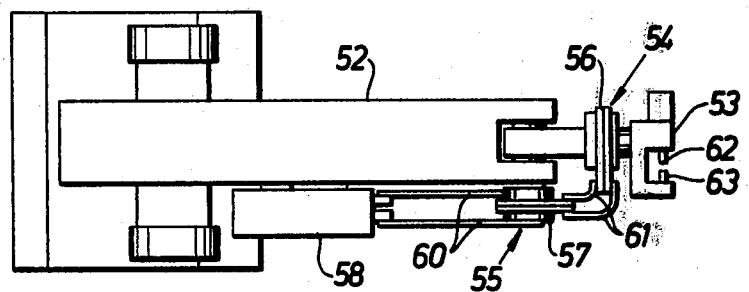

FIGS. 6 and 7 show a welding robot having a resistance welding head 53 attached to an articulated arm 52 provided with two pivot joints 54, 55 the axis of which are at right angles to each other. Each of the joints is provided with a contact device 56, 57, respectively, of the type above described with reference to FIGS. 3 to 5. A welding transformer 58 supported by the arm 52 is connected to the mains by a cable 59. The secondary of the welding transformer is connected to the outer pair of contact plates of the contact device 57 by conductor bars 60. Another pair of conductor bars 61 connects the inner pair of contact plates of the device 57 with the inner pair of conductors of the contact device 56. The outer pair of contact plates of the device 56 is connected to the electrodes 62, 63 of the resistance welding head 53 by conductors not visible in the figures.

The conductor bars 61 are flexible enough to permit the small axial displacements of the inner contact plates of the contact devices 56, 57. When an adjustment of the position of the welding head is to be carried out, each of the inner contact plates of the devices 56, 57 is moved out of engagement with the corresponding outer contact plate, as described with reference to FIGS. 3 to 5. When the required angular adjustment of the arm links about the axes of the pivot joints 54, 55 has been carried out, the inner contact plates of the devices 56, 57 are pushed into firm engagement with the respective outer contact plates by the means described with reference to FIGS. 3 to 5, whereby the required electrical connection between the various conductors of the welding circuit is established and the arm links are firmly held in the adjusted position.

The switching of the welding current is preferably carried out in the usual manner by means of a switch in the primary circuit of the welding transformer. The operation of the contact devices as well as the angular adjustment of the arm links will in that case be carried out at times when the welding circuit carries no voltage. It is possible, however, to employ the contact device according to the invention as a switch. The current of air or gas escaping between the opposed contact surfaces then may perform the additional function of suppressing any sparking or arcing which may tend to occur. Also, the gas will blow away any loose particles which may be present between the contact faces.

We claim:

1. In a resistance welder, a combined pivot joint and electric contact device between two welding current conductors forming part of the welding circuit of the resistance welder, comprising:
    a joint pin,
    a pair of flat contact plates extending at right angles to said joint pin and connected each to one of said conductors, said contact plates being supported for relative rotation about said joint pin and being axially displaceable with respect to each other between a contact position in which the contact plates engage each other and an idle position in which the contact plates are out of engagement with each other,
    means for yieldably urging at least one of said contact plates towards the other contact plate, and
    means for moving said contact plates out of engagement with each other including
    a channel provided in at least one of the contact plates, said channel having an outlet port in the plate surface facing the other contact plate and an inlet, and,
    means including a valve and a supply conduit for connecting said inlet to a source of compressed gas.

2. A device as claimed in claim 1 in which the contact plate which is connected to the source of compressed gas includes at least three channels having outlet ports which are evenly distributed around the pin axis.

3. A device as claimed in claim 2 in which each of said channels is connected to the supply conduit through a restricted passage.

4. A device for providing a pivot joint between a first and a second pair of welding current conductors forming part of a welding circuit of a resistance welder and for connecting the conductors of the second pair in series with the conductors of the first pair, the conductors of the first pair being connected to opposite terminals of a source of welding current so as to carry current in opposite directions, said device comprising:
    a joint pin;
    two pairs of contact plates supported for relative rotation about said joint pin and forming an axial row of contact plates therein, the contact plates of a first one of said pairs of contact plates being connected each to one conductor of said first pair of conductors, and the contact plates of the second one of said pair of contact plates being connected each to one conductor of said second pair of conductors;
    electrically insulating means for maintaining the contact plates of said first pair of contact plates axially stationary with respect to each other, the contact plates of said second pair of contact plates being axially displaceable each with respect to a corresponding one of the contact plates of said first pair of contact plates;
    means for yieldably urging each of the contact plates of said second pair of contact plates into engagement with a corresponding one of the contact plates of said first pair of contact plates; and
    means for moving each of the contact plates of said second pair of contact plates out of engagement with the corresponding contact plate of said first pair of contact plates including
    a channel provided in at least one of the two contact plates arranged to engage each other, said channel having an outlet port in the plate surface facing the other of said two plates and an inlet, and
    means including a valve and a supply conduit for connecting said inlet to a source of compressed gas.

5. A device as claimed in claim 4 in which the contact plates of said first pair of contact plates constitute the outer members of the axial row of contact plates.

6. A device as claimed in claim 5 in which the means for yieldably urging the contact plates of the second pair of contact plates into engagement with the corresponding contact plates of the first pair of contact plates is arranged axially between and is common to the contact plates of said second pair.

7. A device as claimed in claim 6 in which the means for yieldably urging the contact plates of the second pair of contact plates into engagement with the corresponding contact plates of the first pair of contact plates includes an expansible receptacle arranged to be connected to a source of compressed gas.

8. A device as claimed in claim 6 in which the means for yieldably urging the contact plates of the second pair of contact plates into engagement with the corresponding contact plates of the first pair of contact plates includes a pair of opposed, annular grooves in the adjacent faces of the contact plates of the second pair of contact plates, a conduit in one of said contact plates for connecting the space enclosed by said grooves to a source of compressed gas, and a pair of flexible sealing rings arranged to cover the gaps between said grooves.

* * * * *